(12) United States Patent
Webb et al.

(10) Patent No.: US 8,189,191 B2
(45) Date of Patent: May 29, 2012

(54) SPECTROSCOPIC IMAGING MICROSCOPY

(75) Inventors: Michael R. Webb, Somerville, MA (US); Christopher Lafratta, Revere, MA (US); David R. Walt, Boston, MA (US)

(73) Assignee: Tufts University, Medford, MA (US)

( * ) Notice: Subject to any disclaimer, the term of this patent is extended or adjusted under 35 U.S.C. 154(b) by 515 days.

(21) Appl. No.: 12/239,628

(22) Filed: Sep. 26, 2008

(65) Prior Publication Data
US 2009/0201499 A1    Aug. 13, 2009

(51) Int. Cl.
*G01J 3/28* (2006.01)
(52) U.S. Cl. .................................. 356/326
(58) Field of Classification Search ........... 356/326–328
See application file for complete search history.

(56) References Cited

U.S. PATENT DOCUMENTS

| | | | |
|---|---|---|---|
| 4,605,306 A * | 8/1986 | Kaffka et al. | 356/334 |
| 4,850,706 A * | 7/1989 | Mikes | 356/328 |
| 4,983,039 A * | 1/1991 | Harada et al. | 356/328 |
| 5,112,125 A | 5/1992 | Neumann | |
| 5,192,980 A | 3/1993 | Dixon et al. | |
| 5,192,981 A * | 3/1993 | Slutter et al. | 356/334 |
| 5,532,818 A * | 7/1996 | Tokumoto | 356/333 |
| 2002/0101589 A1* | 8/2002 | Sandstrom et al. | 356/334 |
| 2005/0073742 A1 | 4/2005 | Weyh et al. | |
| 2005/0286048 A1* | 12/2005 | Kitagawa | 356/318 |
| 2008/0074664 A1* | 3/2008 | Ganiere | 356/308 |

FOREIGN PATENT DOCUMENTS

EP    1936422    6/2008

OTHER PUBLICATIONS

International Search Report and Written Opinion for application No. PCT/US2009/058404, dated Feb. 24, 2010.

* cited by examiner

*Primary Examiner* — Kara E Geisel
(74) *Attorney, Agent, or Firm* — Fish & Richardson P.C.

(57) ABSTRACT

Disclosed herein are systems that include: (a) an objective lens system configured to collect light from a sample; (b) a first aperture positioned to allow a portion of the collected light received from the objective lens system to pass as input light; (c) a first lens positioned to transmit the input light received from the first aperture; (d) a dispersive element configured to spatially disperse the input light received from the first lens in a first plane; (e) a second lens positioned to transmit the spatially dispersed light; (f) a second aperture positioned to allow a portion of the spatially dispersed light received from the second lens to pass as detection light; and (g) a detector positioned to receive the detection light and configured to form at least one image of the sample.

28 Claims, 7 Drawing Sheets

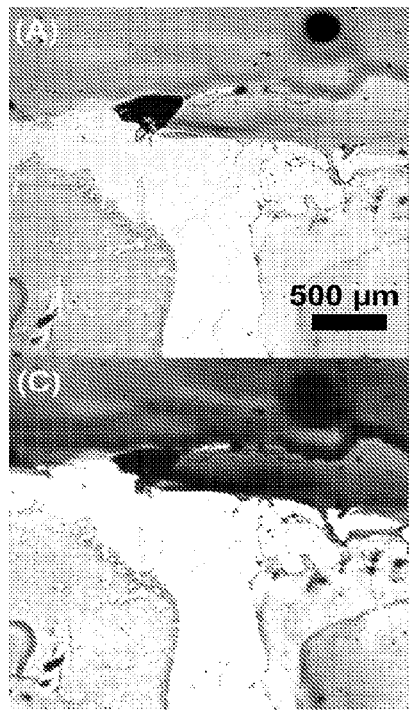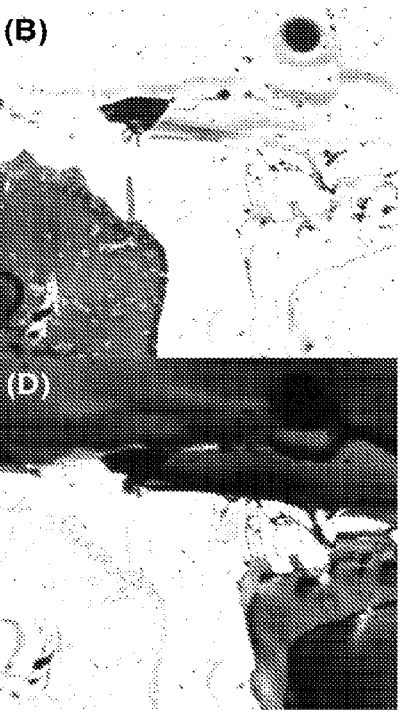
FIG. 10A  FIG. 10B
FIG. 10C  FIG. 10D
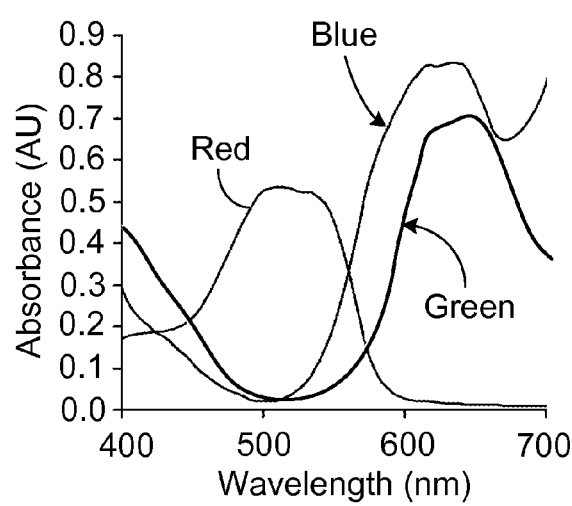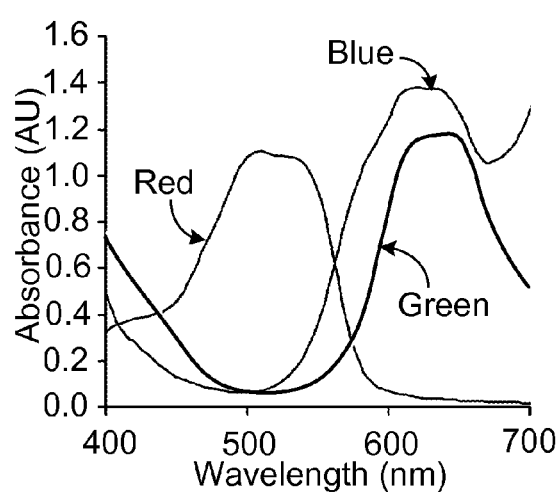
FIG. 11A  FIG. 11B

SPECTROSCOPIC IMAGING MICROSCOPY

STATEMENT AS TO FEDERALLY SPONSORED RESEARCH

This invention was made with Government support under United States Army contract no. W911NF-07-1-0647. The Government has certain rights in this invention.

TECHNICAL FIELD

This invention relates to microscope imaging.

BACKGROUND

Microscope imaging is widely used to investigate samples, e.g., biological samples, that emit or attenuate light in ultraviolet, visible, and/or infrared regions of the electromagnetic spectrum. Simple filters, e.g., interference filters, can be used to filter the light emitted by the sample to restrict the light to fall within specific regions of the spectrum. By filtering the emitted light, certain sample features of interest can be isolated and investigated.

SUMMARY

Systems and methods for spectroscopic imaging microscopy are disclosed herein. The systems are wavelength-tunable, and can provide spectral filtering of light emitted by samples so that sample images can be obtained based on spectral bands at selected central wavelengths and having selected spectral bandwidths. One or more dispersive optical elements, in combination with lenses and apertures, provide the spectral filtering capability. The dispersive optical elements, lenses, and apertures are optically coupled to one or more detectors configured to measure sample images. The systems are tunable through a broad range of central wavelengths, and the spectral bandwidth of the assemblies can be adjusted by changing the size of aperture openings. By maintaining a relatively narrow spectral bandwidth and obtaining a large number of sample images at different central wavelengths, wavelength-dependent spectroscopic imaging can be implemented.

Spectroscopic imaging methods have numerous applications. For example, spectroscopic techniques can be applied to the study of biological samples that include different fluorescent and/or phosphorescent spectral labeling moieties, and/or spectrally distinct absorbers. For example, different labeling moieties can bind to selected biological structures within the sample or be expressed differently in various portions of a sample, and spectroscopic imaging methods can be used to identify how these labeling moieties are distributed within the sample. When these labeling moieties bind specifically to particular biological (e.g., cellular) structures, for example, the systems and methods disclosed herein can be used to investigate the structure and function of selected regions of the sample. As another example, when the systems disclosed herein are configured to acquire a plurality of sample images at different central wavelengths, the plurality of sample images can be analyzed and sample properties such as absorption spectra, reflection spectra, emission spectra, luminescence spectra, and scattered light spectra of sample components in situ can be determined.

In general, in one aspect, the disclosure features systems that include: (a) an objective lens system configured to collect light from a sample; (b) a first aperture positioned to allow a portion of the collected light received from the objective lens system to pass as input light; (c) a first lens positioned to transmit the input light received from the first aperture; (d) a dispersive element configured to spatially disperse the input light received from the first lens in a first plane; (e) a second lens positioned to transmit the spatially dispersed light; (f) a second aperture positioned to allow a portion of the spatially dispersed light received from the second lens to pass as detection light; and (g) a detector positioned to receive the detection light and configured to form at least one image of the sample. The input light is incident on a first surface of the dispersive element, and the spatially dispersed light leaves the dispersive element through the first surface. An angle, measured in the first plane, between a principal propagation direction of the input light and a normal to the first surface corresponds to a first angle; an angle, measured in the first plane, between a principal propagation direction of the spatially dispersed light and the normal to the first surface corresponds to a second angle; and a difference between the first angle and the second angle is less than 10 degrees.

Embodiments of the systems can include one or more of the following features.

During operation, a central wavelength of the portion of the spatially dispersed light allowed to pass by the second aperture can be selected by changing a position of the dispersive element. The systems can include an electronic processor configured to select the central wavelength of the portion of the spatially dispersed light that passes through the second aperture by changing the position of the dispersive element.

The first lens can be configured to focus the input light onto the first surface. The first and second apertures can each include circular openings. The systems can include an electronic processor configured to select a full-width at half maximum (FWHM) spectral bandwidth of the portion of the spatially dispersed light that passes through the second aperture by adjusting a dimension of the aperture. The electronic processor can be configured to adjust the FWHM spectral bandwidth to a value between two nm and 30 nm.

The sample can be positioned in a second plane, the first surface can be positioned in a third plane, and the detector can be positioned in a fourth plane, the second, third, and fourth planes being optically conjugate planes. The first aperture can be positioned in a second plane and the second aperture can be positioned in a third plane, the second and third planes being optically conjugate planes.

The dispersive element can include at least one element selected from the group consisting of a diffraction grating, a prism, and a grating-prism. The first angle can be less than 30 degrees.

The systems can include an electronic processor coupled to the detector, where the electronic processor is configured to obtain a plurality of images of the sample, and where each image of the plurality of images corresponds to a different central wavelength of the spatially dispersed light. The electronic processor can be configured to display at least one of the plurality of images. The electronic processor can be configured to form a composite image by combining information from at least two images of the plurality of images.

The first lens can be configured to image the sample onto the first surface. The second aperture can include multiple openings, where a different portion of the spatially dispersed light passes through each of the openings. Each of the different portions of the spatially dispersed light can be received by the detector and used to form a different image of the sample.

Each of the first and second angles can be 30 degrees or less. At least one of the first and second lenses can include a curved mirror. The first lens can include a curved mirror. The second lens can include a curved mirror.

The spatially dispersed light at the second aperture can be substantially free of chromatic aberration. The dispersive element can include a prism and a mirror that contacts a surface of the prism.

Embodiments of the systems can also include any of the other features disclosed herein, as appropriate.

In another aspect, the disclosure features systems that include: (a) an objective lens system configured to collect light from a sample; (b) a first aperture positioned to allow a portion of the collected light received from the objective lens system to pass as transmitted light; (c) a partially-reflective mirror positioned to reflect a portion of the transmitted light as input light; (d) a lens positioned to direct the input light received from the partially-reflective mirror to a dispersive element configured to spatially disperse the input light in a first plane, and positioned to direct the spatially dispersed light received from the dispersive element to the partially-reflective mirror; (e) a second aperture positioned to allow a portion of the spatially dispersed light transmitted by the partially-reflective mirror to pass as detection light; and (f) a detector positioned to receive the detection light and configured to form at least one image of the sample. The input light is incident on a first surface of the dispersive element, and the spatially dispersed light leaves the dispersive element through the first surface. An angle, measured in the first plane, between a principal propagation direction of the input light and a normal to the first surface corresponds to a first angle; an angle, measured in the first plane, between a principal propagation direction of the spatially dispersed light and the normal to the first surface corresponds to a second angle; and a difference between the first angle and the second angle is less than 10 degrees.

Embodiments of the systems can include one or more of the following features.

During operation, a central wavelength of the portion of the spatially dispersed light allowed to pass by the second aperture can be selected by changing a position of the dispersive element. The systems can include an electronic processor configured to select the central wavelength of the portion of the spatially dispersed light that passes through the second aperture by changing the position of the dispersive element.

The lens can include a curved mirror. The dispersive element can include a prism and a mirror that contacts a surface of the prism.

The systems can include an electronic processor configured to select a full-width at half maximum (FWHM) spectral bandwidth of the portion of the spatially dispersed light that passes through the second aperture by adjusting a dimension of the aperture.

The sample can be positioned in a second plane, the first surface can be positioned in a third plane, and the detector can be positioned in a fourth plane, the second, third, and fourth planes being optically conjugate planes. The first aperture can be positioned in a second plane and the second aperture can be positioned in a third plane, the second and third planes being optically conjugate planes.

Embodiments of the systems can also include any of the other features disclosed herein, as appropriate.

In a further aspect, the disclosure features methods that include: (a) directing light from a sample to a dispersive optical element, and dispersing the incident light in a first plane to form spatially dispersed light emitted from the dispersive optical element; (b) directing the spatially dispersed light to be incident on an aperture; (c) detecting a portion of the spatially dispersed light that passes through the aperture; and (d) forming an image of the sample based on the detected light. The light from the sample is incident on a surface of the dispersive optical element at a first angle, measured in the first plane, with respect to a surface normal; the spatially dispersed light leaves the surface of the dispersive optical element at a second angle, measured in the first plane, with respect to the surface normal; and a difference between the first and second angles is 10 degrees or less.

Embodiments of the methods can include one or more of the following features.

The methods can include adjusting a position of the dispersive optical element to select a central wavelength of the portion of the spatially dispersed light that passes through the aperture. The methods can include adjusting a dimension of the aperture to select a spectral bandwidth of the portion of the spatially dispersed light that passes through the aperture.

The methods can include forming a plurality of images of the sample, each of the images corresponding to a different central wavelength. The methods can include determining at least a portion of a spectrum of a component in the sample based on information derived from the plurality of images, where the spectrum includes at least one of an absorption spectrum, a reflection spectrum, an emission spectrum, a luminescence spectrum, and a scattered light spectrum of the component.

Embodiments of the methods can also include any of the other features or method steps disclosed herein, as appropriate.

For purposes of this disclosure, a lens can include any optical element that focuses or defocuses light rays that are incident on the lens. Exemplary lenses include transmissive concave lenses, transmissive convex lenses, transmissive compound lenses formed of multiple optical components, reflective concave lenses (e.g., concave curved mirrors), reflective convex lenses (e.g., convex curved mirrors), and lens systems that include multiple components that function together to focus or defocus light rays that are incident on the lens system.

Embodiments can include one or more of the following advantages.

The systems disclosed herein permit sample imaging at high magnification (e.g., microscope imaging), where the wavelength at which sample images are obtained and the spectral width of the band of detected light that is used to form the image are selectable in a rapid and straightforward fashion. For example, the systems include a dispersive element (e.g., a diffraction grating or a prism), and by changing the position of the dispersive element (e.g., by rotating the dispersive element), the central wavelength of the spectral band of light detected by the detector can reliably be selected. As another example, the systems include an adjustable aperture, and by changing a size (e.g., a dimension, such as a maximum dimension) of an opening in the aperture, the bandwidth of the spectral band of light can reliably be selected. The selection of the center wavelength and spectral width of the detected band of light can be performed manually by a system operator, or automatically (e.g., by an electronic processor).

The systems disclosed herein can be configured to obtain sample images that are free of chromatic aberration and other imaging artifacts. For example, in some embodiments, the systems are configured so that an entrance aperture of the system is imaged onto an exit aperture of the system. Such a configuration helps to reduce or eliminate image errors that might otherwise arise from passage of light through the apertures (e.g., due to vignetting). In certain embodiments, the systems are configured so that an angle of incidence of the light on the dispersive element is equal (or nearly equal) to an angle at which spatially dispersed light emerges from the dispersive element. By maintaining this relationship between the angles, chromatic aberration in the measured images can be reduced or eliminated.

The systems can be configured to provide similar spatial resolution at all points in the measured images of the sample. For example, the systems can include circular entrance and exit apertures, which ensure that the numerical aperture of the overall system—and therefore the spatial resolution—is the same at each point in the image plane.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and description. Other features and advantages will be apparent from the description, drawings, and claims.

DESCRIPTION OF DRAWINGS

FIGS. 10A-D are images of a test sample measured at different central wavelengths.

FIG. 11A is a graph showing absorption spectra of three different inks in the sample of FIGS. 10A-D, determined from images of the sample obtained at a large number of different central wavelengths.

FIG. 11B is a graph showing absorption spectra of the three inks of FIG. 10A, measured with a UV-visible spectrophotometer.

Like reference symbols in the various drawings indicate like elements.

DETAILED DESCRIPTION

The spectroscopic imaging microscope systems disclosed herein include elements for collecting light emitted by samples, elements for spatially dispersing and selecting wavelength components of the emitted light, and one or more detectors for measuring the selected wavelength components. These elements permit observation and imaging of spectrally filtered images of the samples. The elements that spatially disperse and select wavelength components can be adjusted to permit a particular band of light wavelengths having a selected central wavelength and a selected full-width at half maximum (FWHM) bandwidth to be incident on one or more detectors for sample observation and/or imaging. By selecting an appropriate band of light wavelengths, a particular analyte in a sample can be investigated without interference from other spectral contributors in the sample. The spatial resolution and/or field of view of the microscopes can also be adjusted by changing particular optical elements of the systems.

Figure 1:
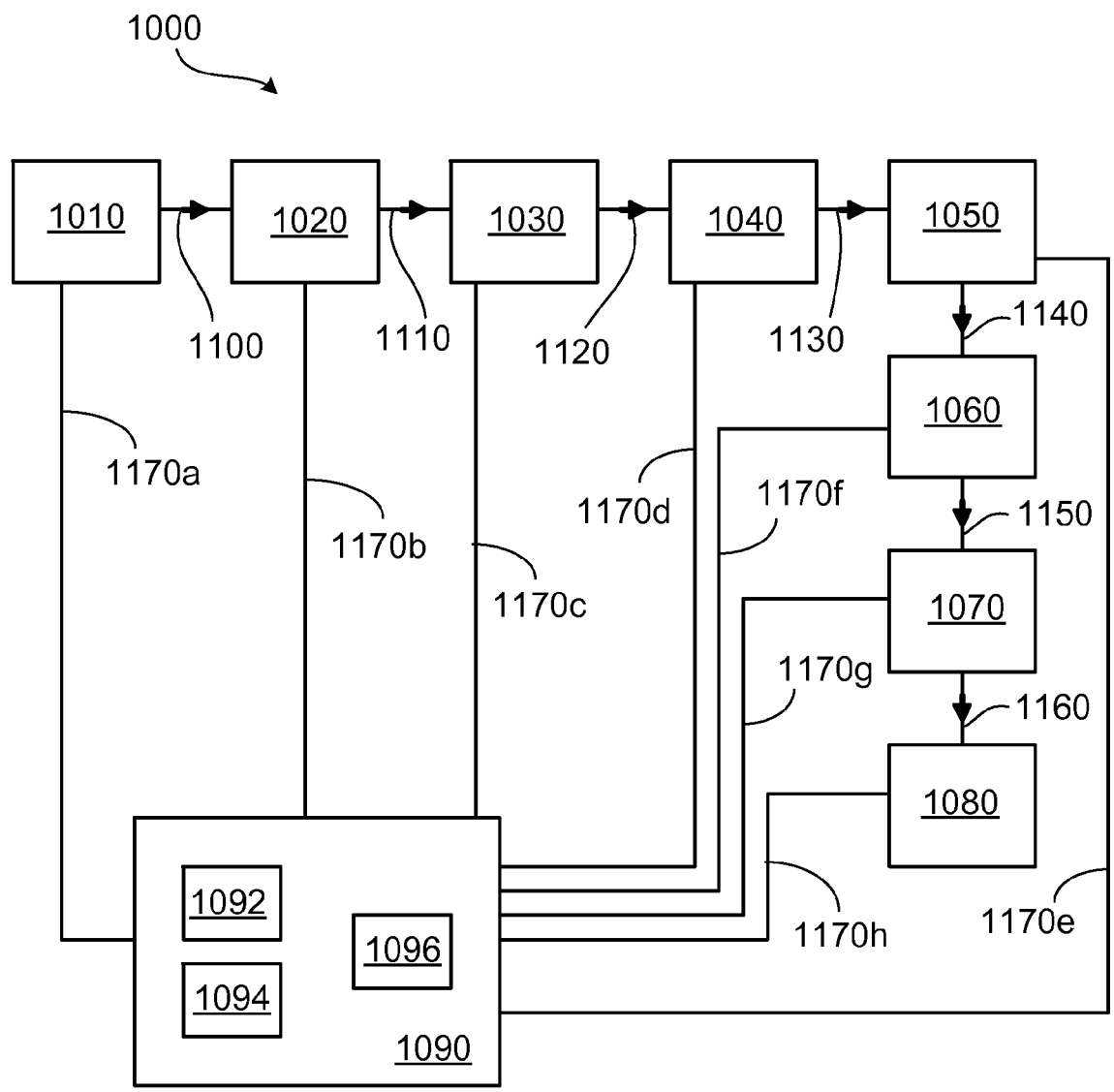
FIG. 1 is a schematic diagram of spectroscopic imaging microscope system.

FIG. 1 shows a general schematic diagram of a spectroscopic imaging microscope system. System 1000 includes a microscope assembly 1010, an objective lens system 1020, a first aperture 1030, a first lens assembly 1040, a dispersive element 1050, a second lens assembly 1060, a second aperture 1070, a detector system 1080, and an electronic processing module 1090 that includes an electronic processor 1092, a control unit 1094, and a display unit 1096.

Microscope assembly 1010 can include various elements such as lenses, filters, light sources, and other elements that are typical of microscope systems. Microscope assembly 1010 also typically includes a support member (such as a stage that can be translated in one or more directions) configured to support a sample.

Objective lens system 1020 can include one or more objective lenses and other optical elements such as windows, filters, beamsplitters, and mirrors. For example, in some embodiments, objective lens system 1020 includes a single objective lens. In general, objective lens system 1020 is positioned to collect light 1100 that is emitted from the sample when the sample is supported by microscope assembly 1010.

The collected light 1110 is directed by objective lens system 1020 to pass through first aperture 1030. First aperture 1030 can generally include one or more elements that act as spatial filters, permitting a portion of collected light 1110 to pass through and blocking a portion of collected light 1110. The size of the opening(s) in first aperture 1030 is/are typically adjustable; adjustment can be performed manually by a system operator, or automatically (e.g., by electronic processor 1092). In general, the shape(s) of the opening(s) in first aperture 1030 can be any of a variety of different shapes, including circular, square, rectangular, a regular polygon having any number of sizes, and an irregularly-shaped opening.

Light 1120 which passes through first aperture 1030 is incident on first lens assembly 1040. First lens assembly 1040 includes one or more lenses which direct light 1120 onto dispersive element 1050 as light 1130. The one or more lenses in first lens assembly 1040 can include, for example, a single lens or multiple lenses. The one or more lenses can be transmissive lenses and/or reflective lenses (e.g., curved mirrors). First lens assembly 1040 can also generally include other optical elements such as windows, flat mirrors, beamsplitters, and filters. In some embodiments, first lens assembly 40 is configured to image the sample onto a surface of dispersive element 1050. In certain embodiments, the sample is not imaged onto the surface of dispersive element 1050.

Dispersive element 1050 is configured to spatially disperse wavelength components of light 1130, and can include one or more dispersive optical components such as transmissive and/or reflective diffraction gratings, phase masks, holographic optical elements, diffractive optical elements, prisms, grating-prisms, optical wedges, and optical windows. Dispersive element 1050 can be mounted on a rotation mount that permits rotation of dispersive element 1050 about one or more axes. The rotation mount can be coupled to a motorized rotation assembly, for example, to permit automated control and changing of the position of dispersive element 1050.

Second lens assembly 1060 can include any of the elements discussed above in connection with first lens assembly 1040; the number and type of elements in second lens assembly 1060 can be the same as, or different from, first lens assembly 1040. In some embodiments, a single lens assembly performs the function of both first and second lens assemblies 1040, 1060. For example, system 1000 can have a folded configuration with a single lens assembly that includes a partially-reflective element such as a beamsplitter. The partially-reflective element can reflect light 1110 toward dispersive element 1050, and transmit spatially dispersed light 1140.

Spatially dispersed light 1150 is directed by second lens assembly 1060 to be incident on second aperture 1070. In general, second aperture 1070 can include any of the components, and any of the features, discussed above in connection with first aperture 1030. Second aperture 1070 can include one or more openings, each of which can be adjustable manually or automatically. Typically, second aperture 1070 is positioned in a plane that is optically conjugate to the plane in which first aperture 1030 is positioned.

Light 1160 (a portion of spatially dispersed light 1150 that passes through second aperture 1070) is detected by detector 1080. Detector 1080, which can include any one or more of a variety of detectors such as photodiode arrays, CCD arrays, film-recording devices, and digital frame capture devices, is configured to form images of the sample based on the detection of light 1160. In some embodiments, detector 1080 can include an ocular for direct observation (e.g., by eye) of light 1160. Detector 1080 can also include various optical elements such as additional lenses, beamsplitters, windows, mirrors, and filters for directing a portion of light 1160 to the ocular.

In certain embodiments, light 1160 can be divided into multiple portions, and some (or all) of the multiple portions can be detected by different detectors. For example, detector 1080 can include one or more beamsplitters which divide light 1160 into two or more portions. One portion can be directed to an ocular, for example, so that a system operator can directly observe the sample. One or more additional portions of light 1160 can be directed to one or more detectors (e.g., photodiode arrays, CCD arrays, film-recording devices, and digital frame capture devices) which can form images of the sample based on the detected light.

As shown in FIG. 1, in some embodiments, system 1000 can be controlled by an electronic processor 1092 that is connected to some or all of the components of system 1000 via electronic communication lines 1170*a-h*. Electronic processor 1092 is also connected to control unit 1094 to permit a user to send instructions to processor 1092, and to display unit 1096 so that electronic processor 1092 can display one or more obtained images. Electronic processor 1092 can be configured, in some embodiments, to combine information from multiple sample images (e.g., combine information from different images obtained at different central wavelengths) to produce composite information (e.g., images). Composite images can be displayed by processor 1092 via display unit 1096, for example.

FIG. 1 is a general schematic diagram of a spectroscopic imaging microscope system, as discussed above. In the subsequent discussion, exemplary embodiments of microscope systems are shown and discussed, but more generally, a wide variety of different embodiments are possible according to the general structure of system 1000 in FIG. 1.

Figure 2:
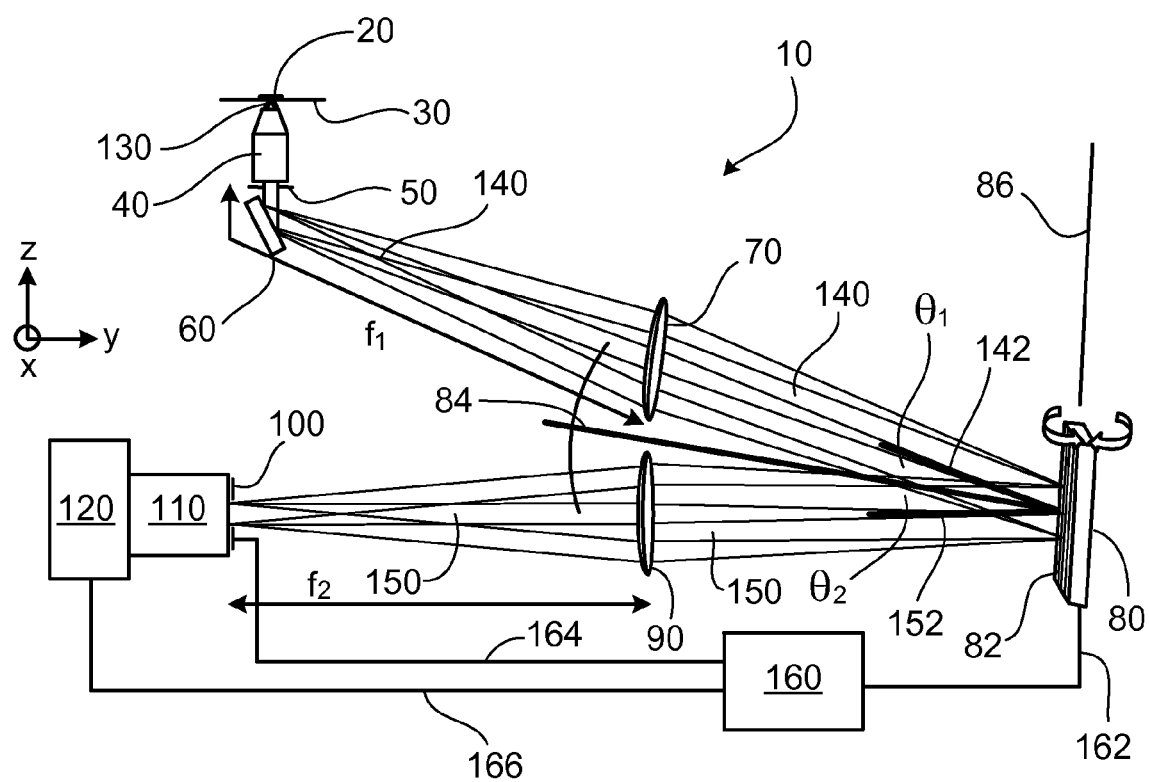
FIG. 2 is a schematic diagram of a side view of an embodiment of a spectroscopic imaging microscope.

FIG. 2 shows a schematic diagram of a side view of an embodiment of a spectroscopic imaging microscope. Microscope 10 includes a sample support 30 (e.g., a microscope stage), an objective lens system 40, a first aperture 50, a mirror 60, a first lens 70, a dispersive element embodied here as a reflective diffraction grating 80, a second lens 90, a second aperture 100, and a detector system that includes detection optics 110 and a detector 120.

During operation, a sample 20 is positioned on sample support 30, and light 130 emitted from sample 20 is collected by objective lens system 40. Emitted light 130 can include, for example, incident light that is transmitted by sample 20, light emitted by one or more fluorescent and/or phosphorescent labels in sample 20, light scattered by sample 20 (e.g., via light scattering and/or Raman scattering) and light from other sources inside sample 20 and/or external to sample 20. Objective lens system 40 collects emitted light 130 to form input light 140. Input light 140 carries an image of sample 20 which is defocused (e.g., partially defocused or completely defocused) as input light 140 passes through aperture 50, ensuring that image artifacts due to vignetting in aperture 50 are reduced and/or eliminated. In this embodiment, aperture 50 is an adjustable circular aperture, and can be adjusted to block a portion of input light 140 as it passes through the aperture. For example, aperture 50 can be adjusted to block light from the edges of input light 140, where the blocked light corresponds to image artifacts and/or other stray light. More generally, aperture 50 can include, for example, an adjustable (e.g., manually and/or automatically) iris with an opening that is circular, ellipsoidal, triangular, square, rectangular, polygonal, irregular, or any other shape, as desired.

Input light 140 is reflected by mirror 60 and is incident on first lens 70. First lens 70 has a focal length $f_1$ and is positioned at a distance $f_1$ from aperture 50 along the path of input light 140 in the embodiment shown in FIG. 2. First lens 70 focuses input light 140 onto surface 82 of diffraction grating 80. Diffraction grating 80 spatially disperses the wavelength components of input light 140, forming spatially dispersed light 150 that is reflected from surface 82.

Grating 80 is oriented to direct spatially dispersed light 150 to be incident on second lens 90, which focuses light 150 onto detection optics 110. Second lens 90 has a focal length $f_2$, and is positioned at a distance $f_2$ from second aperture 100. Second aperture 100 is an adjustable circular aperture, and is typically configured to permit only a portion of spatially dispersed light from being passing through the aperture and entering detection optics 110. Because the various wavelength components of spatially dispersed light 150 are mapped onto particular spatial locations in the transverse profile of light 150 by grating 80, second aperture 100 permits only a selected band of light wavelengths to enter detection optics 110. Once inside detection optics 110, the light admitted by second aperture 100 is measured by detector 120, which forms an image of sample 20 corresponding to the admitted band of spectral wavelengths.

To select the band (e.g., to select the center wavelength of the band) of spectral wavelengths that passes through second aperture 100, diffraction grating 80 is rotated about axis 86 in FIG. 2. Axis 86 is parallel to the plane of surface 82 and also parallel to the plane of FIG. 2. With reference to the coordinate axes shown in FIG. 2, axis 86 is either parallel to, or inclined at an angle to, the z-axis in the y-z plane, depending upon the orientation of grating 80.

Rotation of grating 80 about axis 86 causes rotation of surface 82 so that spatially dispersed light 150 is swept across the opening in second aperture 100 in the x-y plane (e.g., in a plane perpendicular to the plane of FIG. 2). To select a particular center wavelength for a band of wavelengths of spatially dispersed light 150 which will be imaged by detector 120, grating 80 is rotated about axis 86 so that the center wavelength of the band is spatially positioned over the opening in second aperture 100. In some embodiments, grating 80 is rotated about axis 86 so that the selected center wavelength of the band is positioned at the midpoint of second aperture 100. In general, however, the center wavelength may or may not be positioned at the midpoint of second aperture 100, depending upon the spectral distribution of light in spatially dispersed light 150.

An image of sample 20 that is carried by spatially dispersed light 150 is defocused as it passes through second aperture 100 in FIG. 2, just as the image of sample 20 carried by input light 140 is defocused as it passes through first aperture 50. As a result, imaging artifacts that might otherwise arise due to vignetting and other optical effects in second aperture 100 can be reduced and/or eliminated.

In FIG. 2, first lens 70 and second lens 90 are positioned so that the opening in first aperture 50 is imaged onto the opening in second aperture 100. In other words, first aperture 50 and second aperture 100 are positioned in conjugate optical planes of microscope 10. Positioning apertures 50 and 100 in conjugate optical planes also helps to ensure that imaging artifacts that can potentially arise from the passage of input light 140 and spatially dispersed light 150 through the apertures are reduced and/or eliminated.

Apertures 50 and 100 in FIG. 2 have circular openings. The use of circular openings helps to ensure that the spatial resolution of images of sample 20 that are carried by input light 140 and/or spatially dispersed light 150 are similar. By using apertures with circular openings, the numerical aperture of microscope 10 is the same in all image directions (e.g., in the two directions orthogonal to the propagation direction of the light that form the image plane). As a result, the spatial resolution of the image in each of the directions is the same.

More generally, however, apertures 50 and/or 100 can have openings of any shape. In some embodiments, for example, either or both of apertures 50 and 100 can have openings that are rectangular in shape, or openings that have the shape of a regular polygon. The openings can be the same size or different sizes, and can have the same shape or different shapes, as desired for particular applications.

In certain embodiments, apertures 50 and/or 100 can include multiple openings. For example, aperture 100 can include two or more openings, each of which permits a spectral band corresponding to a different central wavelength to be detected by detector 120. Detector 120 can be used in a multiplex configuration to acquire multiple images of sample 20 at the same time, each image corresponding to a different central wavelength of light. Some or all of the multiple apertures can be adjustable, so that the FWHM of some or all of the different spectral bands detected by detector 120 can be adjusted for particular samples and/or experimental conditions.

In the embodiment shown in FIG. 2, the image of sample 20 is focused by first lens 70 onto surface 82 of grating 80. That is, sample 20 is imaged onto grating 80, so that sample 20, grating 80, and detector 120 are in conjugate optical planes of microscope 10. More generally, in some embodiments, sample 20 is not imaged onto grating 80 by first lens 70. That is, surface 82 of grating 80 is not positioned in a plane that is optically conjugate to the planes of sample 20 and detector 120. Typically, however, first and second lenses 70 and 90 are positioned such that the sum of the distances between first lens 70 and surface 82 along the optical path of input light 140, and between surface 82 and second lens 90 along the optical path of spatially dispersed light 150, corresponds to the sum of the lens focal lengths, $f_1+f_2$.

In general, the focal lengths $f_1$ and $f_2$ of lenses 70 and 90 can be selected as desired, according to geometric and other constraints of microscope 10. In some embodiments, $f_1$ and $f_2$ have the same value, while in other embodiments, they have different values. In the embodiment shown in FIG. 2, each of $f_1$ and $f_2$ is the same, e.g., 300 mm. In general, however, lenses 70 and 90 can be selected from among lenses with a wide range of different focal lengths. The main criteria for selecting $f_1$ and $f_2$ are the geometric constraints of microscope 10, the desired spatial and spectral resolution of microscope 10, and the optical properties of the other elements in microscope 10 (e.g., objective lens system 40, diffraction grating 90, and first and second apertures 50 and 100). In general, for lenses of longer focal length, the bandwidth of the spectral band that passes through aperture 100 is smaller. However, larger diameter lenses and larger dispersive elements are typically required when longer focal lengths are used. Accordingly, the choice of focal lengths $f_1$ and $f_2$ is largely a matter of satisfying particular physical design preferences (e.g., a preference for a device of a certain size).

In FIG. 2, the propagation direction of input light 140 is parallel to a principal ray of input light 140. Similarly, the propagation direction of spatially dispersed light 150 is parallel to a principal ray of spatially dispersed light 150. Further, a normal to surface 82 of grating is oriented perpendicular to both surface 82 and axis 86 in FIG. 2. Mirror 60, grating 80, and lenses 70 and 90 are oriented so that input light 140 can, in general, be incident on surface 82 in a direction that is not parallel to any of the x, y, and z directions in FIG. 2. In general, spatially dispersed light can leave surface 82 along a direction that is not parallel to any of the x, y, and z-directions. However, to simplify the discussion of the angles involved, spatially scattered light 150 leaves surface 82 in the x-y plane in FIG. 2.

In FIG. 2, the projection of the principal ray of input light 140 onto the y-z plane is shown as ray 142. Similarly, the projection of the principal ray of spatially scattered light 150 onto the y-z plane is shown as ray 152. The projection of a normal to surface 82 onto the y-z plane in FIG. 2 is shown as normal projection 84. Ray 142 forms an angle $\theta_1$ with normal projection 84 in the y-z plane. Ray 152 forms an angle $\theta_2$ with normal projection 84 in the y-z plane. In other words, input light 140 is incident on surface 82 of grating 80 at an angle $\theta_1$, measured in the y-z plane, with respect to a normal to surface 82. Spatially dispersed light leaves surface 82 of grating 80 at an angle $\theta_2$, measured in the y-z plane, with respect to a normal to surface 82. Microscope 10 is generally configured so that $\theta_1=\theta_2$.

In the embodiment shown in FIG. 2, the angles $\theta_1$ and $\theta_2$ are each approximately 6.25 degrees. Generally, however, angles $\theta_1$ and $\theta_2$ can be selected based on geometrical constraints on the shape of microscope 10, for example. In some embodiments, for example, each of angles $\theta_1$ and $\theta_2$ can be 1 degree or more (e.g., 3 degrees or more, 5 degrees or more, 10 degrees or more, 20 degrees or more, 30 degrees or more, 40 degrees or more, 50 degrees or more) and/or 89 degrees or less (e.g., 85 degrees or less, 80 degrees or less, 75 degrees or less, 70 degrees or less, 65 degrees or less, 60 degrees or less, 55 degrees or less).

Figure 3:
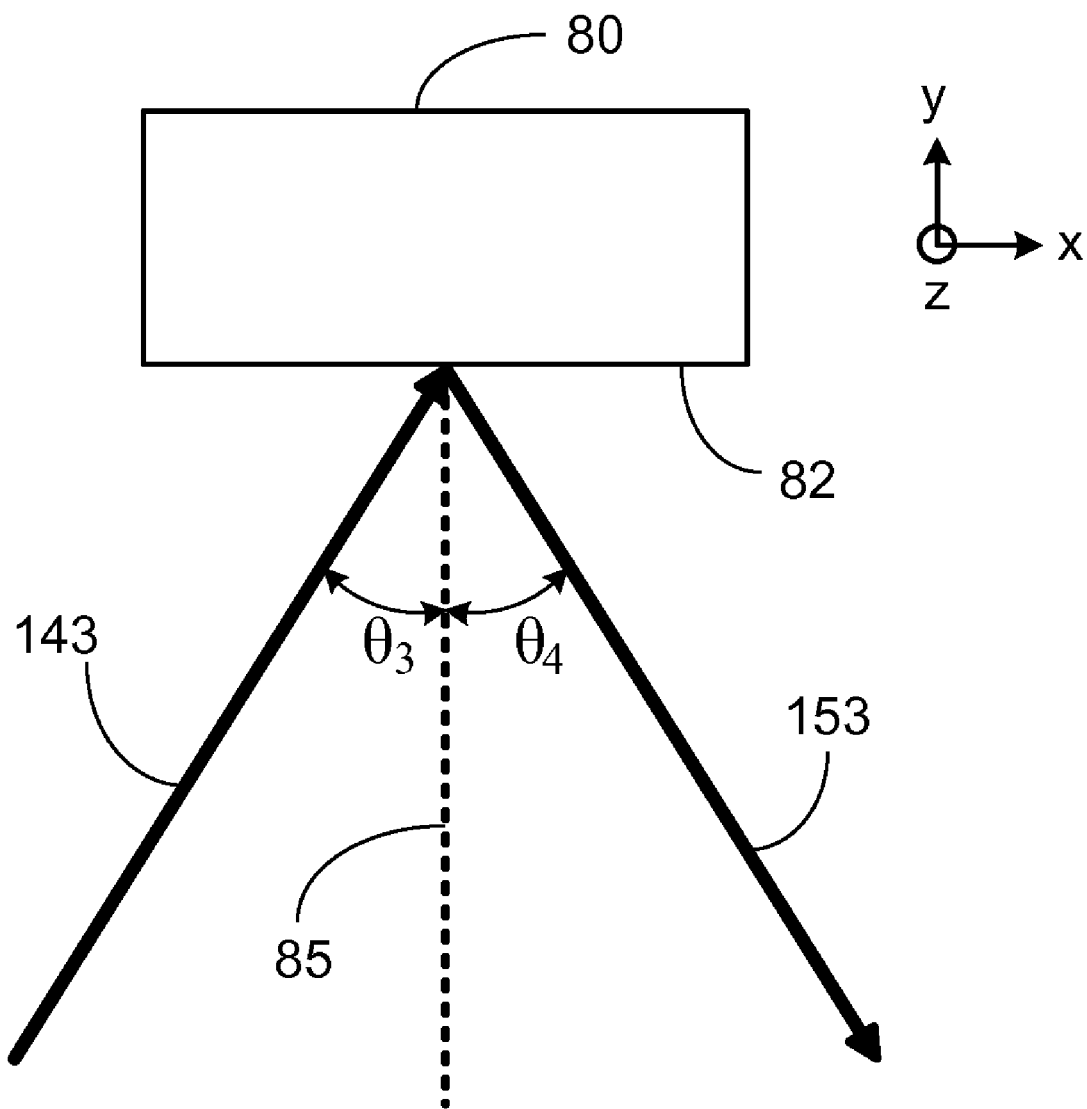
FIG. 3 is a schematic diagram showing a top view of the microscope of FIG. 2.

Grating 80 is oriented so that the wavelength components of spatially dispersed light 150 are dispersed in the x-y plane of FIG. 2. By rotating grating 80 about axis 86, a particular band of the dispersed spectral components can be directed to pass through aperture 100. FIG. 3 shows a top view of diffraction grating 80. In FIG. 3, the projection of the principal ray of input light 140 onto the x-y plane is shown as ray 143. Similarly, the projection of the principal ray of spatially scattered light 150 onto the x-y plane is shown as ray 153. The projection of a normal to surface 82 onto the x-y plane in FIG. 3 is shown as normal projection 85. Ray 143 forms an angle $\theta_3$ with normal projection 85 in the x-y plane. Ray 153 forms an angle $\theta_4$ with normal projection 85 in the x-y plane. In other words, input light 140 is incident on surface 82 of grating 80 at an angle $\theta_3$, measured in the x-y plane, with respect to a normal to surface 82. Spatially dispersed light leaves surface 82 of grating 80 at an angle $\theta_4$, measured in the x-y plane, with respect to a normal to surface 82.

In some embodiments, microscope 10 is configured so that $\theta_3=\theta_4$. Such a configuration reduces and/or eliminates chromatic aberration in images of sample 20 that are obtained by detector 120, because the optical paths of the various wavelength components in input light 140 and spatially dispersed light 150 are equal. When chromatic aberration is present, for example, images of sample 20 at different central wavelengths can be stretched or compressed relative to one another, due to different optical path lengths of the various wavelength components in microscope 10. By ensuring that $\theta_3=\theta_4$ images of sample 20 obtained at different central wavelengths can each have the same aspect ratio and focal properties due to the reduction or absence of chromatic aberration. For example, when $\theta_3=\theta_4$, spatially dispersed light 150 at the position of second aperture 100 can substantially free of chromatic aberration.

In general, the angles $\theta_3$ and $\theta_4$ can be the same or different. Each of angles $\theta_3$ and $\theta_4$ can be 89 degrees or less (e.g., 80 degrees or less, 70 degrees or less, 60 degrees or less, 50 degrees or less, 40 degrees or less, 30 degrees or less, 20 degrees or less, 15 degrees or less, 10 degrees or less, 5 degrees or less, 4 degrees or less, 3 degrees or less, 2 degrees or less, 1 degree or less, 0.5 degrees or less, 0.25 degrees or less, 0.1 degrees or less, or even less). In some embodiments, a difference between angles $\theta_3$ and $\theta_4$ can be 89 degrees or less (e.g., 80 degrees or less, 70 degrees or less, 60 degrees or less, 50 degrees or less, 40 degrees or less, 30 degrees or less, 20 degrees or less, 18 degrees or less, 16 degrees or less, 14 degrees or less, 12 degrees or less, 10 degrees or less, 8 degrees or less, 6 degrees or less, 5 degrees or less, 4 degrees or less, 3 degrees or less, 2 degrees or less, 1 degree or less, 0.5 degrees or less, 0.25 degrees or less, 0.1 degrees or less, or even less). When angles $\theta_3$ and $\theta_4$ are different, microscope 10 can, in some embodiments, include additional optical components such as lenses, prisms, windows, and other elements to reduce chromatic aberration in spatially dispersed light 150.

In certain embodiments, microscope 10 can be operated in a zero-order mode where the angles $\theta_3$ and $\theta_4$ are zero or nearly zero. For example, each of $\theta_3$ and $\theta_4$ can be 10 degrees or less (e.g., 8 degrees or less, 6 degrees or less, 5 degrees or less, 4 degrees or less, 3 degrees or less, 2 degrees or less, 1 degree or less, 0.5 degrees or less, 0.25 degrees or less, 0.1 degrees or less, or even less, or even zero). In this mode of operation, the spectral band of wavelengths that passes through second aperture 100 can be very wide, and can correspond to 70% or more (e.g., 75% or more, 80% or more, 85% or more, 90% or more, 95% or more, 97% or more, 99% or more) of the FWHM spectral bandwidth of spatially dispersed light 150. As a result, images of sample 20 that are obtained by detector 120 can correspond approximately to images that would be obtained in the absence of any filtering of input light 140.

In general, the FWHM spectral bandwidth of the portion of spatially dispersed light 150 that passes through second aperture 100 depends upon a number of factors including the size of the opening in second aperture 100, the spatial density of grooves on surface 82 of diffraction grating 80, and the focal lengths $f_1$ and $f_2$. In some embodiments, the size of second aperture 100 can be adjusted to change the FWHM spectral bandwidth of the portion of spatially dispersed light 150 that passes through the aperture. In certain embodiments, for example, the FWHM spectral bandwidth of the portion of spatially dispersed light that passes through second aperture 100 can be 100 nm or less (e.g., 75 nm or less, 50 m or less, 35 nm or less, 25 nm or less, 15 nm or less, 10 nm or less, 5 nm or less, 4 nm or less, 3 nm or less, 2 nm or less). In certain embodiments, the FWHM spectral bandwidth of the portion of spatially dispersed light that passes through second aperture 100 can be varied, by adjusting the aperture, from two nm to 50 nm (e.g., from two nm to 40 nm, from two nm to 30 nm, from two nm to 20 nm, from two nm to 10 nm).

As discussed above, the central wavelength of the portion of spatially dispersed light 150 that passes through second aperture 100 depends upon the orientation and properties (e.g., number of grooves per millimeter) of diffraction grating 80. In general, the central wavelength can be selected by rotating grating 80 from among any of the wavelengths present in the spectral bandwidth of spatially dispersed light 150. Microscope 10 can generally be configured to collect light from sample 20 in a broad range of spectral wavelengths, including (but not limited to) the ultraviolet, visible, and infrared regions of the electromagnetic spectrum. Accordingly, by adjusting the orientation of grating 80, the central wavelength of the portion of spatially dispersed light 150 that passes through second aperture 100 can be selected from among wavelengths in the ultraviolet, visible, and infrared regions of the spectrum.

Detection optics 110 can generally include a variety of optical elements such as lenses, mirrors, dispersive elements (e.g., gratings, prisms), windows, and other elements configured to receive the portion of spatially dispersed light 150 that passes through second aperture 100, and to direct the portion of light to be incident on detector 120. Detector 120 can include one or more of a variety of different types of detection elements, configured such that detector 120 can obtain images of sample 20. Typically, for example, detector 120 includes one or more imaging detectors such as CCD arrays, photodiode arrays, cameras (e.g., video cameras and/or film cameras) and detectors that include photosensitive recording media.

Diffraction grating 80 can generally be formed of any of a variety of different materials. In some embodiments, for example, diffraction grating 80 can include a base formed of a material such as glass, with a coating positioned on the base. The coating can be formed of a material such as a metal (e.g., gold, silver, or aluminum) that efficiently reflects wavelength components in input light 140. Grooves are formed in the coating material to permit spatial dispersion of the wavelength components of input light 140. For example, in FIG. 2, grating 80 has 1200 grooves per mm. In general, the number of grooves per mm on grating 80 can be selected according to a desired spatial dispersion of the wavelength components of input light 140, a desired reflection efficiency, and other criteria. Exemplary gratings can include 300, 600, 900, 1200, 1500, 1800, 2400, or 3600 grooves per mm, although larger and/or smaller numbers of grooves per mm are also possible.

The various components of microscope 10 can be adjusted manually by a system operator, or automatically by the microscope. For example, in some embodiments, microscope 10 includes an electronic processor 160 coupled, through electronic controllers and/or drive mechanisms, to any of the components in microscope 10, including first and second apertures 50 and 100, first and second lenses 70 and 90, and diffraction grating 80. Electronic processor 160 can be configured to automatically adjust a maximum dimension of either or both of apertures 50 and/or 100, to adjust the positions of lenses 70 and/or 90 along the optical paths of input light 140 and spatially dispersed light 150, and to adjust the orientation of diffraction grating 80 about axis 86 (e.g., to select a particular central wavelength of the portion of spatially dispersed light 150 that passes through second aperture 100. Electronic processor 160 can also be electrically coupled to detector 120, and can be configured to control acquisition of images of sample 20 by detector 120. In the embodiment shown in FIG. 2, electronic processor is coupled to diffraction grating 80, second aperture 100, and detector 120 via electrical communication lines 162, 164, and 166, respectively. In general, microscope 10 can include any number of connections between electronic processor 160 and the various components of the microscope.

Electronic processor 160 can also be configured to display one or more images of sample 20 that are obtained. For example, electronic processor 160 can be electrically connected to a display unit included in microscope 10. Alternatively, electronic processor 160 can be connected to a remote display unit (e.g., via a network, such as a wireless network, a wired network, and/or the internet), and electronic processor 160 can transmit image data to the remote unit for display to a system operator, for example.

In some embodiments, electronic processor 160 can be configured to form one or more composite images from the images of sample 20. For example, electronic processor 160 can be configured to combine image two or more images, each corresponding to different central wavelengths, to produce a composite image that includes contributions from multiple spectral contributors in sample 20.

Figure 4:
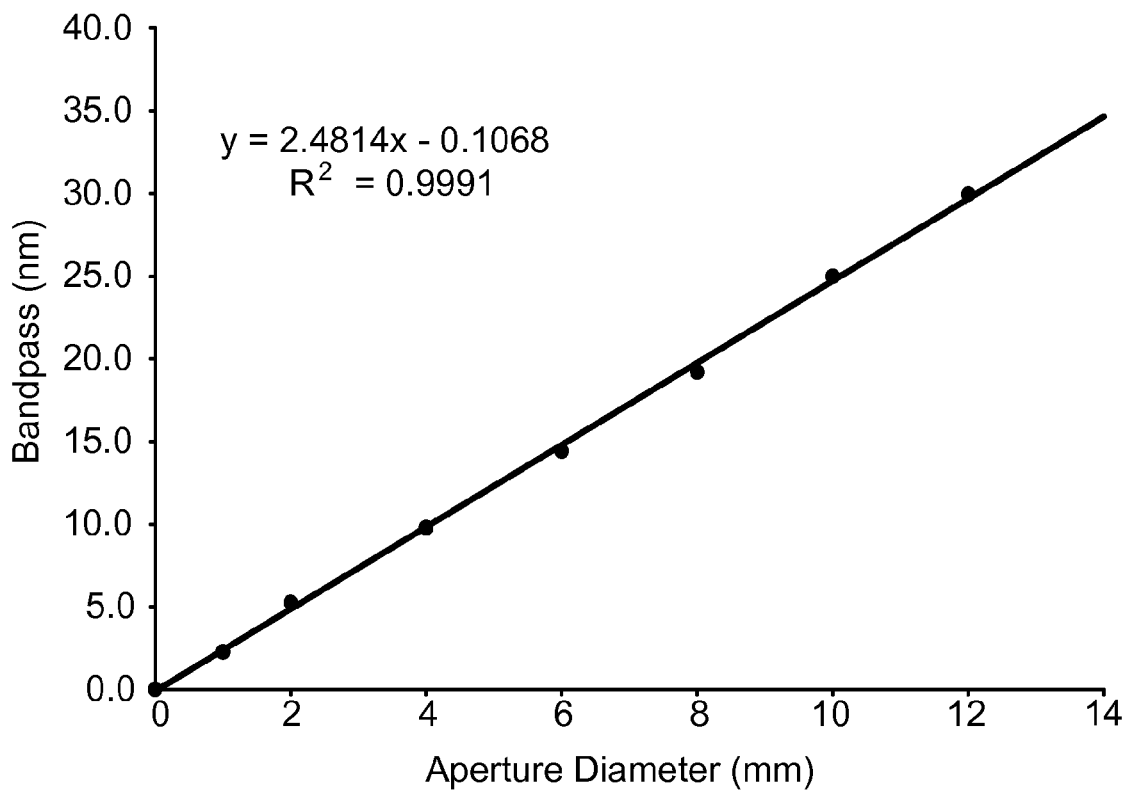
FIG. 4 is a graph of the spectral bandwidth of the light detected by the detector as a function of a diameter of a microscope aperture.

The performance of microscope 10 was tested by varying a maximum dimension of second aperture 100, and measuring the FWHM spectral bandwidth of the portion of spatially dispersed light 150 that passed through aperture 100. FIG. 4 shows a graph of the FWHM spectral bandwidth ("Bandpass") as a function of the diameter of the opening in second aperture 100 ("Aperture Diameter"). As shown in FIG. 4, the spectral bandwidth scales approximately linearly with the size of the aperture opening, so that a particular spectral bandwidth can reliably be selected by appropriate adjustment of second aperture 100. The spectral bandwidth can also be altered by using a diffraction grating 80 having a different number of grooves per mm on surface 82, and/or by using a second lens 90 with a different focal length $f_2$.

Microscope 10 was also tested in an effort to determine its spatial resolution. A United States Air Force (USAF) 1951 target was used to test the ability of microscope 10 to resolve closely-spaced test patterns. Objective lens system 40 included a 0.5-NA, 60× objective. The target included sets of three closely-spaced bars, separated by gaps of width equal to the bars.

Figure 5:
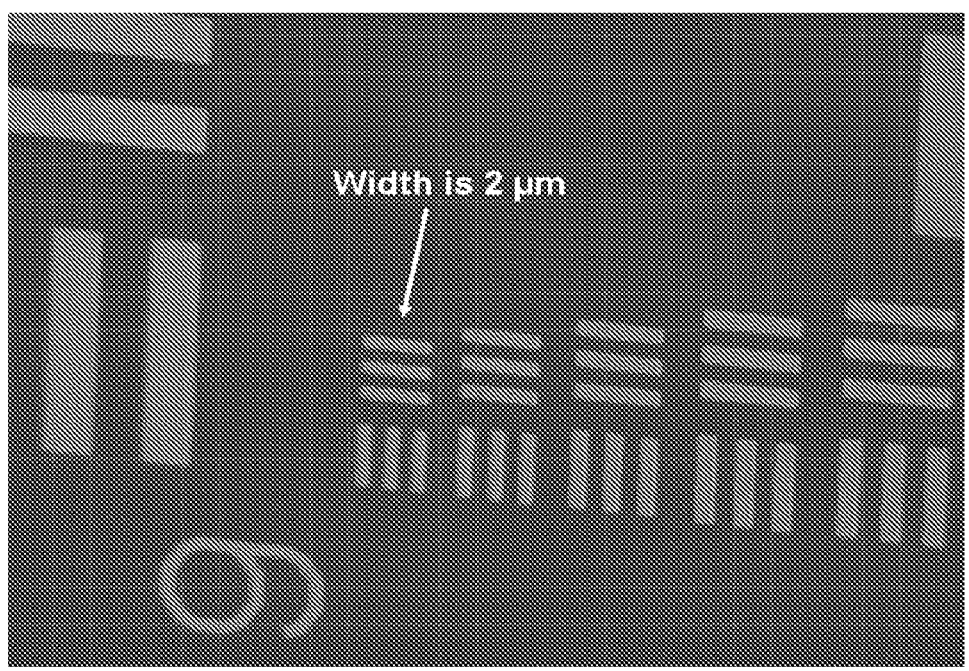
FIG. 5 is an image of a test pattern used to evaluate the spatial resolution of the microscope.

FIG. 5 shows an image of the target obtained with microscope 10. The 2 μm-wide bars, spaced 2 μm apart in FIG. 4, were easily resolved, indicating that the resolution of microscope 10 is better than 2 μm. The spatial resolution of microscope 10 may be improved even further with a different objective lens system 40.

Figure 6:
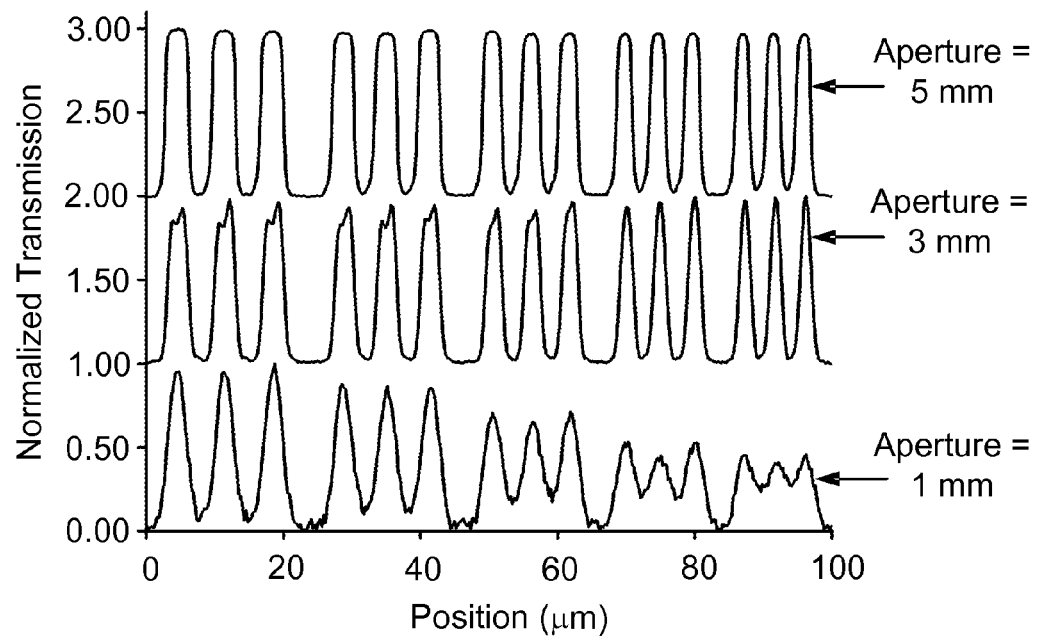
FIG. 6 is a graph showing a series of line scans through the test pattern of FIG. 3 corresponding to different aperture diameters.

The spatial resolution of microscope 10 depends on the numerical aperture (NA) of the combination of objective lens system 40 and first aperture 50. When second aperture 100 has a relatively large opening, the resolution of microscope 10 is determined by the NA of objective lens system 40. When second aperture 100 has a smaller opening, the overall NA and resolution of microscope 10 can be reduced. FIG. 6 shows a graph of line scans through groups of three bars in the USAF 1951 target. The target was imaged using a 0.5-NA, 50× objective lens in objective lens system 40. Each of the three line scans in FIG. 6 proceeds through a series of bars with progressively-reduced widths; from left-to-right, the bar widths are 3.47, 3.11, 2.76, 2.46, and 2.19 μm. The top line scan corresponds to an aperture opening of 5 mm. The middle line scan corresponds to an aperture opening of 3 mm, and the bottom line scan corresponds to an aperture opening of 1 mm. As FIG. 6 shows, at aperture openings of 5 mm and 3 mm, even the smallest-width bars are baseline-resolved. However, for the 1 mm aperture opening, the intensity of the valley region between the bars is approximately 60% of the peak intensity of the bars, reflecting reduced spatial resolution.

Figure 7:
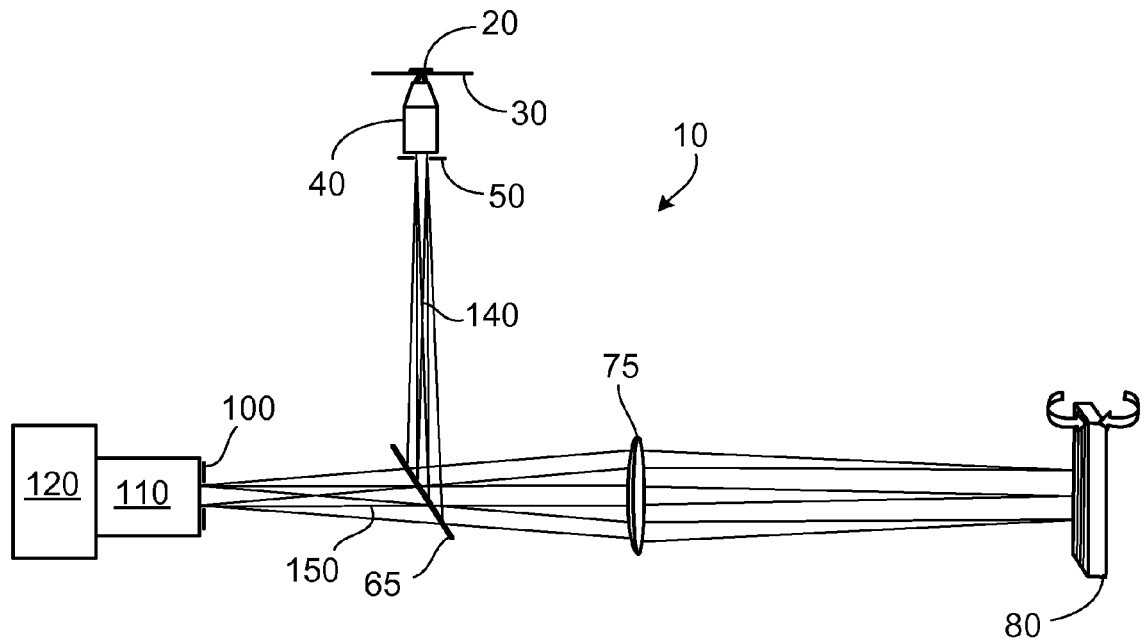
FIG. 7 is a schematic diagram of another embodiment of a spectroscopic imaging microscope.

Microscope 10 can be configured in a variety of different ways. For example, FIG. 7 shows another embodiment of microscope 10 where lenses 70 and 90 have been replaced by a single lens 75. Beamsplitter 65 directs input light 140 to lens 75, which further directs input light 140 to be incident on diffraction grating 80. Spatially dispersed light 150, which reflects from grating 80, passes back through lens 75 and beamsplitter 65, and is incident upon second aperture 100. In general, as shown in FIG. 7, certain lenses in microscope 10 can be eliminated by adopting a folded configuration.

Figure 8:
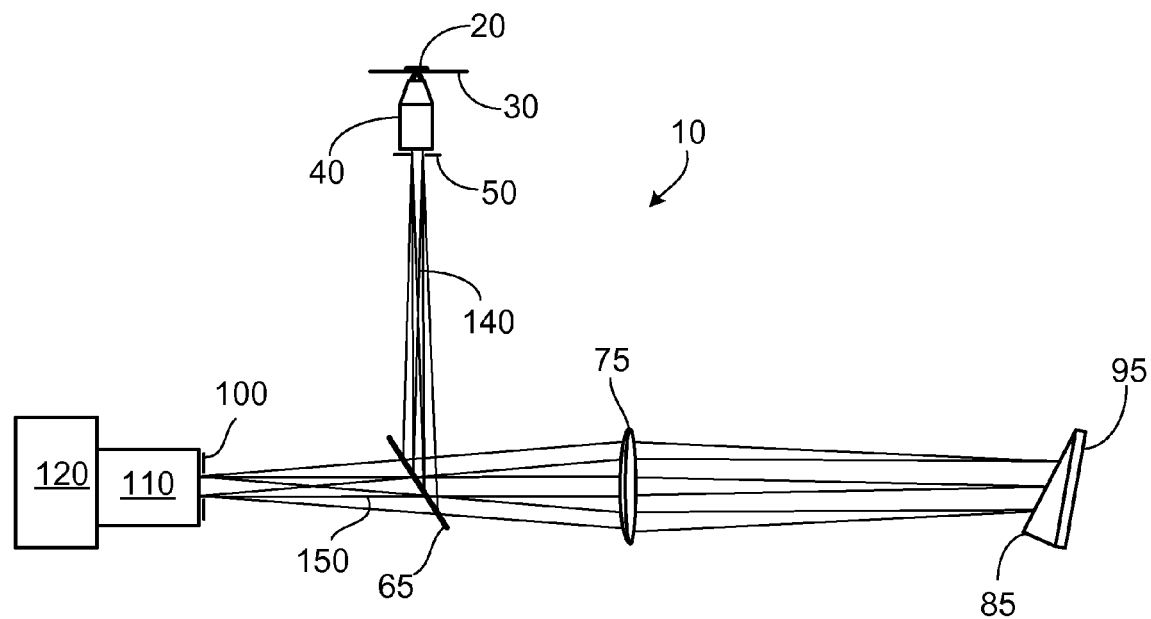
FIG. 8 is a schematic diagram of a further embodiment of a spectroscopic imaging microscope.

In certain embodiments, a dispersive element other than a reflective diffraction grating can be used to disperse the wavelength components of input light 140. Dispersive elements such as prisms, holographic optical elements, grating-prisms, phase masks, and transmissive diffraction gratings can be used in addition to, or as alternatives to, diffraction grating 80. FIG. 8 shows an embodiment of a microscope 10 in which diffraction grating 80 has been replaced by a combination of a prism 85 and a mirror 95. The other components of microscope 10 are similar to those of FIG. 7. In FIG. 8, prism 85 disperses the wavelength components of input light 140, and mirror 95 directs the light to make two passes through prism 85.

Figure 9:
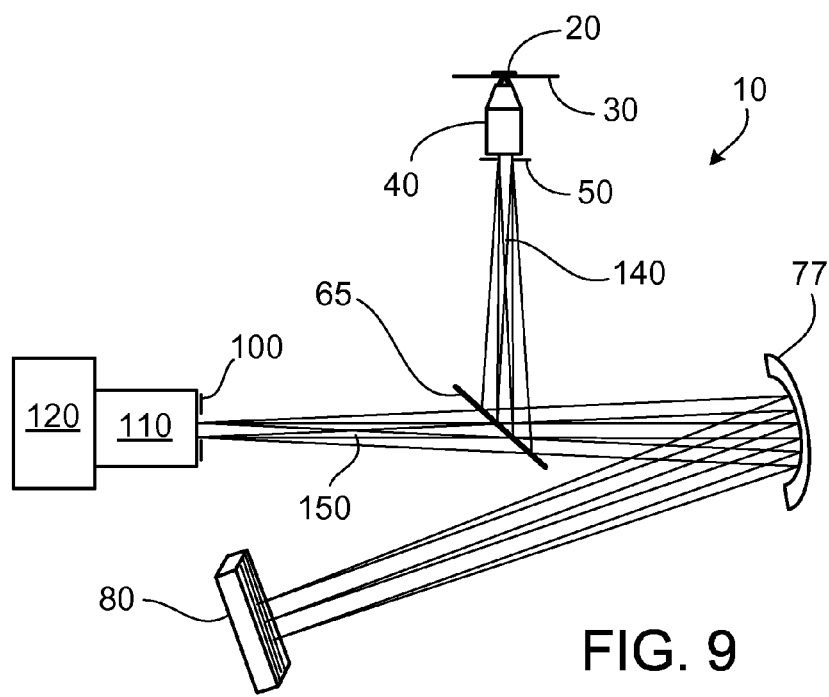
FIG. 9 is a schematic diagram of yet another embodiment of a spectroscopic imaging microscope.

In some embodiments, one or more lenses can be replaced with curved mirrors that perform a similar function. FIG. 9 shows an embodiment of microscope 10 that is similar to the embodiment shown in FIG. 7, except that lens 75 is replaced with a curved mirror 77. Mirror 77 is positioned to receive input light 140 reflected by beamsplitter 65, and configured to direct input light 140 to be incident on grating 80. Mirror 77 is also positioned to receive spatially dispersed light 150 from grating 80, and configured to direct spatially dispersed light 150 to be incident on second aperture 100. The other components of microscope 10 in FIG. 9 are similar to corresponding components in FIG. 7.

Microscope 10 permits imaging of sample 20 with adjustable spatial and/or spectral resolution. In some embodiments, sample 20 can be imaged by obtaining multiple images, each corresponding to a different central wavelength of spatially dispersed light 150. By appropriate selection of the central wavelengths, the images can be used to investigate certain components in sample 20 (e.g., components which yield particular, well-defined spectral responses) without interference from other components, which have spectral responses in different spectral bands. In certain embodiments, a series of sample images corresponding to different central wavelengths can be used to determine different types of spectra—including absorption spectra, reflection spectra, emission spectra, luminescence spectra, and scattered light spectra—for components of sample 20. This can be particularly useful when the absorption spectra are influenced by the local environment of the components. For example, in some embodiments, absorption spectra can be constructed by examining only certain regions of images of a sample that are obtained at different central wavelengths.

To evaluate the ability of microscope 10 to measure absorption spectra of sample components, a synthetic sample was constructed. The sample included a coverslip upon which portions of red, green, and blue ink were drawn. Microscope 10 was operated in zero-order mode to acquire an image of the sample, and then adjusted to select different central wavelengths. At each selected central wavelength, an image of the sample was obtained. For each of the images obtained, apertures 50 and 100 were set at 3 mm, corresponding to a spectral resolution of 7.3 nm.

A total of 46 different central wavelengths were selected, and the images at each central wavelength were analyzed in different spatial locations to obtain absorption spectral for each of the three different inks. FIGS. 10A-D show images of the sample at various different central wavelengths. FIG. 10A is the image of the sample obtained in the zero-order configuration, and corresponds essentially to a white-light image of the sample. FIGS. 10B-D are images obtained at central wavelengths of 505 nm, 575 nm, and 650 nm, respectively, corresponding roughly to the blue, green, and red inks.

FIG. 11A shows the absorption spectra of each of the three inks determined from the 46 images obtained using microscope 10. FIG. 11B shows absorption spectra of the same three inks measured with a UV-visible spectrophotometer. There is a close correspondence between the spectra measured with different techniques for each ink, suggesting that microscope 10 can reliably be used to determine absorption spectra for in situ components of samples under study. This capability is particularly important because determination of in situ spectra of sample components is a problem that is difficult to address with conventional spectroscopic methods. At the same time, determination of in situ spectra can provide information about the chemical and/or biological environment of the sample components (e.g., because absorption spectra can change due to factors such as local solvent environment), and can assist in determining both structural and functional information about different portions of samples.

Hardware and Software Implementation

The method steps and procedures described herein can be implemented in hardware or in software, or in a combination of both. In particular, the electronic processors (e.g., processors 1092 and/or 160) can include software and/or hardware instructions to perform any of the methods discussed above. The methods can be implemented in computer programs using standard programming techniques following the method steps and figures disclosed herein. Program code is applied to input data to perform the functions described herein. The output information is applied to one or more output devices such as a printer, or a display device, or a web page on a computer monitor with access to a website, e.g., for remote monitoring.

Each program is preferably implemented in a high level procedural or object oriented programming language to communicate with a processor. However, the programs can be implemented in assembly or machine language, if desired. In any case, the language can be a compiled or interpreted language. Each computer program can be stored on a storage medium or device (e.g., an electronic memory) readable by the processor, for configuring and operating the processor to perform the procedures described herein.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A system comprising:
an objective lens system configured to collect light from a sample;
a first aperture positioned to allow a portion of the collected light received from the objective lens system to pass as input light, wherein the input light carries an image of the sample that is defocused as it passes through the first aperture;
a first lens positioned to transmit the input light received from the first aperture;
a dispersive element configured to spatially disperse the input light received from the first lens in a first plane;
a second lens positioned to transmit the spatially dispersed light;
a second aperture positioned to allow a portion of the spatially dispersed light received from the second lens to pass as detection light; and
a detector positioned to receive the detection light and configured to form at least one image of the sample,
wherein the input light is incident on a first surface of the dispersive element, and the spatially dispersed light leaves the dispersive element through the first surface; and
wherein an angle, measured in the first plane, between a principal propagation direction of the input light and a normal to the first surface corresponds to a first angle, an angle, measured in the first plane, between a principal propagation direction of the spatially dispersed light and the normal to the first surface corresponds to a second angle, and a difference between the first angle and the second angle is less than 10 degrees.

2. The system of claim 1, wherein during operation, a central wavelength of the portion of the spatially dispersed light allowed to pass by the second aperture is selected by changing a position of the dispersive element.

3. The system of claim 1, wherein the first and second apertures each comprise circular openings.

4. The system of claim 2, further comprising an electronic processor configured to select the central wavelength of the portion of the spatially dispersed light that passes through the second aperture by changing the position of the dispersive element.

5. The system of claim 1, further comprising an electronic processor configured to select a full-width at half maximum (FWHM) spectral bandwidth of the portion of the spatially dispersed light that passes through the second aperture by adjusting a dimension of the aperture.

6. The system of claim 1, wherein the sample is positioned in a second plane, the first surface is positioned in a third plane, and the detector is positioned in a fourth plane, the second, third, and fourth planes being optically conjugate planes.

7. The system of claim 1, wherein the first aperture is positioned in a second plane and the second aperture is positioned in a third plane, the second and third planes being optically conjugate planes.

8. The system of claim 1, wherein the dispersive element comprises at least one element selected from the group consisting of a diffraction grating, a prism, and a grating-prism.

9. The system of claim 1, wherein the first angle is less than 30 degrees.

10. The system of claim 5, wherein the electronic processor is configured to adjust the FWHM spectral bandwidth to a value between two nm and 30 nm.

11. The system of claim 1, further comprising an electronic processor coupled to the detector, wherein the electronic processor is configured to obtain a plurality of images of the sample, and wherein each image of the plurality of images corresponds to a different central wavelength of the spatially dispersed light.

12. The system of claim 11, wherein the electronic processor is configured to display at least one of the plurality of images.

13. The system of claim 11, wherein the electronic processor is configured to form a composite image by combining information from at least two images of the plurality of images.

14. The system of claim 1, wherein the first lens is configured to image the sample onto the first surface.

15. The system of claim 1, wherein each of the first and second angles is 30 degrees or less.

16. The system of claim 1, wherein the spatially dispersed light at the second aperture is substantially free of chromatic aberration.

17. The system of claim 1, wherein the dispersive element comprises a prism and a mirror that contacts a surface of the prism.

18. A system comprising:
an objective lens system configured to collect light from a sample;
a first aperture positioned to allow a portion of the collected light received from the objective lens system to pass as transmitted light;
a partially-reflective mirror positioned to reflect a portion of the transmitted light as input light;
a lens positioned to direct the input light received from the partially-reflective mirror to a dispersive element configured to spatially disperse the input light in a first plane, and positioned to direct the spatially dispersed light received from the dispersive element to the partially-reflective mirror;
a second aperture positioned to allow a portion of the spatially dispersed light transmitted by the partially-reflective mirror to pass as detection light; and
a detector positioned to receive the detection light and configured to form at least one image of the sample,
wherein the input light is incident on a first surface of the dispersive element, and the spatially dispersed light leaves the dispersive element through the first surface; and
wherein an angle, measured in the first plane, between a principal propagation direction of the input light and a normal to the first surface corresponds to a first angle, an angle, measured in the first plane, between a principal propagation direction of the spatially dispersed light and the normal to the first surface corresponds to a second angle, and a difference between the first angle and the second angle is less than 10 degrees.

19. The system of claim 18, wherein during operation, a central wavelength of the portion of the spatially dispersed light allowed to pass by the second aperture is selected by changing a position of the dispersive element.

20. The system of claim 19, further comprising an electronic processor configured to select the central wavelength of the portion of the spatially dispersed light that passes through the second aperture by changing the position of the dispersive element.

21. The system of claim 18, further comprising an electronic processor configured to select a full-width at half maximum (FWHM) spectral bandwidth of the portion of the spatially dispersed light that passes through the second aperture by adjusting a dimension of the aperture.

22. The system of claim 18, wherein the sample is positioned in a second plane, the first surface is positioned in a third plane, and the detector is positioned in a fourth plane, the second, third, and fourth planes being optically conjugate planes.

23. The system of claim 18, wherein the first aperture is positioned in a second plane and the second aperture is positioned in a third plane, the second and third planes being optically conjugate planes.

24. A method for measuring a sample image, the method comprising:
directing light from a sample to pass through a first aperture and be incident on a dispersive optical element, and dispersing the incident light in a first plane to form spatially dispersed light emitted from the dispersive optical element;
directing the spatially dispersed light to be incident on a second aperture;
detecting a portion of the spatially dispersed light that that passes through the second aperture; and
forming an image of the sample based on the detected light,
wherein an image of the sample carried by the light is defocused when it passes through the first aperture; and
wherein the light from the sample is incident on a surface of the dispersive optical element at a first angle, measured in the first plane, with respect to a surface normal, the spatially dispersed light leaves the surface of the dispersive optical element at a second angle, measured in the first plane, with respect to the surface normal, and a difference between the first and second angles is 10 degrees or less.

25. The method of claim 24, further comprising adjusting a position of the dispersive optical element to select a central wavelength of the portion of the spatially dispersed light that passes through the aperture.

26. The method of claim 24, further comprising adjusting a dimension of the second aperture to select a spectral bandwidth of the portion of the spatially dispersed light that passes through the aperture.

27. The method of claim 25, further comprising forming a plurality of images of the sample, each of the images corresponding to a different central wavelength.

28. The method of claim 27, further comprising determining at least a portion of a spectrum of a component in the sample based on information derived from the plurality of images, wherein the spectrum comprises at least one of an absorption spectrum, a reflection spectrum, an emission spectrum, a luminescence spectrum, and a scattered light spectrum of the component.

* * * * *

UNITED STATES PATENT AND TRADEMARK OFFICE
CERTIFICATE OF CORRECTION

| | |
|---|---|
| PATENT NO. | : 8,189,191 B2 |
| APPLICATION NO. | : 12/239628 |
| DATED | : May 29, 2012 |
| INVENTOR(S) | : Michael R. Webb |

It is certified that error appears in the above-identified patent and that said Letters Patent is hereby corrected as shown below:

Column 18, Line 29, in Claim 24, Line 6, after "that" delete "that".

Signed and Sealed this
Eleventh Day of September, 2012

David J. Kappos
*Director of the United States Patent and Trademark Office*